(12) United States Patent
Chen

(10) Patent No.: US 6,190,572 B1
(45) Date of Patent: Feb. 20, 2001

(54) POLISHING COMPOSITION FOR LEATHER

(76) Inventor: Shih Yao Chen, 7 Fl., No. 39 Chung-Sing Rd., Sanchung City, Taipei Hsien (TW)

( * ) Notice: Under 35 U.S.C. 154(b), the term of this patent shall be extended for 0 days.

(21) Appl. No.: 09/397,083

(22) Filed: Sep. 16, 1999

(51) Int. Cl.[7] ............................... C09G 1/08; C09G 1/04; C09D 191/06
(52) U.S. Cl. .............................. 252/8.57; 106/8; 106/10; 106/268; 106/271
(58) Field of Search .............................. 252/8.57; 106/8, 106/10, 268, 271

(56) References Cited

U.S. PATENT DOCUMENTS

| | | | |
|---|---|---|---|
| 4,218,250 | * | 8/1980 | Kasprzak .................. 106/3 |
| 4,497,919 | * | 2/1985 | Varga et al. ............... 524/10 |
| 5,968,238 | * | 10/1999 | Healy et al. .............. 106/3 |

* cited by examiner

*Primary Examiner*—Anthony Green
(74) *Attorney, Agent, or Firm*—Bacon & Thomas

(57) ABSTRACT

An aqueous polishing composition for leather containing in intermixture of a water phase and an oil phase is disclosed. The water phase containing a mixture of an antiseptic, an ethylamine, and water. The oil phase containing a mixture of carnauba, bees wax, an oleic acid, and an antioxidant. The resultant oil phase and water phase forms an emulsion by mixing them together and then cooling. More specific instructions of the preparation of the aqueous polishing composition for leather and leather products are disclosed in the specifications.

6 Claims, No Drawings

POLISHING COMPOSITION FOR LEATHER

FIELD OF THE INVENTION

The present invention relates to the general field of polishing compositions, particularly, polishing compositions for the leather material found in shoes.

BACKGROUND OF THE INVENTION

Most conventional polishing compositions for leather or shoes are made by blending and melting wax with an organic solvent (e.g. alkanes). However, because of the flammability of the organic solvent, the manufacturing processes of these conventional polishing compositions are potentially dangerous and are capable of becoming harmful for the health of the operators. The organic solvents that escape from the manufacturing location of the polishing compositions during the manufacturing process also results in air pollution problems in the manufacturing area. Hence, an organic polishing composition without organic solvent is highly demanded in today's market.

In addition, most conventional polishing compositions are not convenient for use because fierce rubbing and frequent buffing is necessary to form the shining film. The films of conventional polishing composition phases out as organic solvents vaporize. To maintain the luster of the films, pigments sometimes are added into the conventional polishing compositions (or pastes) to enhance shining effect or colors of the conventional polishing compositions for leather. However, the cost of polishing compositions (or pastes) increases and the color difference between the color of the original leather and that which the pigment generates also increases.

Recently, liquid polishing compositions for leathers (shoes) were invented, but organic solvents are still the major solvents used for diluting liquid polishing compositions. As mentioned above, air pollution problems and flammable danger are still the major drawbacks of these liquid-polishing compositions. Besides, the gloss of the films formed from these liquid polishing compositions strongly depends on the concentration of wax in the liquid polishing composition. In liquid polishing compositions for spray coating or brush coating, the concentration of wax is diluted to a low concentration to facilitate coating. Consequently, the gloss of the films formed from liquid polishing composition fades a lot.

To improve the lost gloss of the films formed from liquid polishing composition with low concentration of wax, some resins or ethers are added into the polishing composition. But these resins or ethers will enhance the aging, peeling and hardening effect that is caused by organic solvent on leather (or shoes). Therefore, a safe polishing composition that will obtain high quality and lasting effect is in high demand.

SUMMARY OF THE INVENTION

The major objectives of the present invention are to provide a polishing composition for leather and for shoes without organic solvents.

Another objective of the present invention is to provide a polishing composition for leather and for shoes with less environmental pollution.

Another objective of the present invention is to provide a safe polishing composition for leather and for shoes with low flammability.

Another objective of the present invention is to provide a method to produce a polishing composition without organic solvents and without environmental pollution.

The polishing compositions of the present invention are comprised of an intermixture of a water phase and an oil phase. Finally the two phases are mixed together to form an emulsion.

DESCRIPTION OF THE PREFERRED EMBODIMENTS

The polishing compositions of the present invention are comprised of an intermixture of a water phase and an oil phase. The oil phase in the polishing compositions of the present invention contains a mixture of carnauba, bees wax, an oleic acid, and an antioxidant. The water phase in the compositions of the present invention contains a mixture of an antiseptic, an ethylamine, and water. The emulsion of polishing compositions is made by mixing the resultant oil phase and water phase together through moderate stirring. This moderate stirring will result in saponification. The polishing compositions of the present invention form as these two mixtures (the oil phase and the water phase) of the compositions are mixed together. As the polishing compositions of the present invention are applied and polished to a surface of leather shoes (or leather products), a thin film with shining gloss forms on the surface of the leather shoes (or leather products).

The oil phase in the polishing compositions of the present invention contains a mixture of carnauba, bees wax, an oleic acid, and an antioxidant. In the oil phase of the compositions of the present invention, the carnauba is used because of its excellent shining property that can enhance the gloss of the films formed by a simple polish. Suitable weight percentage of carnauba in the compositions of the present invention ranges from 0.5% to 30%. Preferably, the weight percentage of the carnauba in the compositions of the present invention ranges from 1% to 15%. The bees wax is used to adjust the viscosity and soften the hardness of the films formed from the compositions. Suitable weight percentage of bees wax in the compositions of the present invention ranges from 0.1% to 30%. However, the preferred weight percentage of the bees wax in the compositions of the present invention ranges from 2% to 20%. The oleic acid is used to be a saponifying agent to accelerate and enhance the saponification occurring in the solution. Suitable weight percentage of the oleic acid in the compositions of the present invention ranges from 0.1% to 30%. Preferably, the weight percentage of the oleic acid in the compositions of the present invention ranges from 3% to 15%. The antioxidant is used to prevent the compositions from oxidation and to extend the shelf life of the compositions. Any antioxidant can be applied in the compositions of the present invention but B.H.T. (bibutyl hydroxy toluene) is preferred. Suitable weight percentage of the antioxidant in the compositions of the present invention ranges from 0.1% to 5%. Preferably, the weight percentage of the antioxidant in the compositions of the present invention ranges from 0.1% to 0.5%.

The water phase in the compositions of the present invention contains a mixture of an antiseptic, an ethylamine, and water. In the water phase of the compositions of the present invention, the antiseptic is used to extend the shelf life of the product as well. Any antiseptic can be applied to the present invention. However, sodium benzoate is preferred. Suitable weight percentage of the antiseptic in the compositions of the present invention ranges from 0.05% to 5%. Preferably, the weight percentage of the antiseptic in the compositions of the present invention ranges from 0.1% to 1%. The ethylamine is used to adjust the pH of the compositions. Suitable percentage of the ethylamine in the compositions of the present invention ranges from 0.1% to 10%.

The weight percentage of the water in the compositions of the present invention ranges from 50% to 80%. Preferably, the weight percentage of water in the compositions of the present invention ranges from 60% to 70%. All weight percentages illustrated above are based on the total weigh of the compositions of the present invention.

The polishing compositions of the present invention is made by the following steps:

1. forming a water phase (mixture A) comprised of an antiseptic, an ethylamine, and water
2. forming an oil phase (mixture B) comprised of carnauba, bees wax, an oleic acid, and an antioxidant
3. heating mixture A and mixture B to a temperature ranging from 65° C. to 85° C. respectively
4. mixing the said mixture A (water phase) and said mixture B (oil phase) with moderate stirring
5. cooling the intermixture of mixture A and mixture B.

*Since mixture A and mixture B can be prepared separately, the polishing compositions of the present invention can also be made by exchanging the sequence of the preparation of mixture A and mixture B. In other words, the polishing compositions of the present invention can be made by preparing mixture B first and then mixture A.

The purpose to heat mixture A and mixture B is to accelerate the saponification that occurs as mixture A and mixture B are mixed together. The polishing compositions of the present invention are available for polishing after compositions are cooled.

The polishing compositions of the present invention for leather can be applied to any leather products to get a shining film on the surface of the leather. They are adequate, in particular, for polishing shoes to obtain a shining surface.

More detailed examples are used to illustrate and explain the present invention. The examples below, which are given simply by way of description, must not be taken to limit the scope of the invention.

EXAMPLE 1

A mixture (mixture A, or water phase) was formed by mixing sodium benzoate(0.2 g), ethylamine(4 g) and water (65.6 g) together in a beaker. Another mixture (mixture B, or oil phase) was formed by mixing carnauba(10 g), bees wax(15 g), oleic acid(5 g) and B.H.T(0.2 g) together in another beaker. Both mixtures (mixture A and mixture B) were heated to 70° C. and maintained at 70° C. The aqueous mixture (mixture A, or water phase) was then slowly added into the oil mixture (mixture B, or oil phase) and the resultant mixture solution was stirred moderately at 70° C. for 30 minutes. After fully stirring, the resultant mixture solution was cooled to room temperature and a white paste was obtained. The resultant white paste was applied to the natural leather surface of shoes and a glossy surface was obtained.

EXAMPLE 2

A mixture (mixture A, or water phase) was formed by mixing sodium benzoate(0.5 g), ethylamine(10 g) and water (63.8 g) together in a beaker. Another mixture (mixture B, or oil phase) was formed by mixing carnauba(2 g), bees wax(3.5 g), oleic acid(10 g) and B.H.T(0.2 g) together in another beaker. Both mixtures (mixture A and mixture B) were heated to 70° C. and maintained at 70° C. The aqueous mixture (mixture A, or water phase) was then slowly added into the oil mixture (mixture B, or oil phase) and the resultant mixture solution was stirred moderately at 70° C. for 30 minutes. After fully stirring, the resultant mixture solution was cooled to room temperature and a white paste was obtained. The resultant white paste was applied to the natural leather surface of shoes and another glossy finish was obtained.

From the foregoing description, one skilled in the art can easily ascertain the essential characteristics of this invention, and, without departing from the scope thereof, can make various changes and modifications of the invention to adapt it to various usages and conditions. Thus, other embodiments are also within the claims.

What is claimed is:

1. A polishing composition, comprising an intermixture of a water phase and an oil phase, wherein:

said water phase containing a mixture of
   (a) 0.05% to 5% by weight of an antiseptic;
   (b) 0.1% to 1.0% by weight of ethylamine; and
   (c) 60% to 70% by weight of water;

said oil phase containing a mixture of
   (d) 1% to 15% by weight of carnauba;
   (e) 2% to 20% by weight of bees wax;
   (f) 3% to 15% by weight of oleic acid; and
   (g) 0.1% to 0.5% by weight of an antioxidant;

the oil phase and water phase forming an emulsion.

2. The composition of claim 1, wherein the antioxidant is bibutyl hydroxy toluene.

3. The composition of claim 1, wherein the antiseptic is sodium benzoate.

4. A method of making a polishing composition comprising the steps of:

(1) forming a water phase comprised of
   (a) 0.05% to 5% by weight of an antiseptic;
   (b) 0.1% to 1.0% by weight of ethylamine; and
   (c) 60% to 70% by weight of water;

(2) forming an oil phase comprised of
   (d) 1% to 15% by weight of carnauba;
   (e) 2% to 20% by weight of bees wax;
   (f) 3% to 15% by weight of oleic acid; and
   (g) 0.1% to 0.5% by weight of an antioxidant;

(3) heating, respectively, said oil phase and said water phase to a temperature ranging from 65° C. to 85° C.;

(4) mixing said water phase and said oil phase together to form an intermixture; and (5) cooling the intermixture of said water phase and said oil phase.

5. The method of claim 4, wherein the antiseptic is sodium benzoate.

6. The method of claim 5, wherein the antioxidant is bibutyl hydroxy toluene.

* * * * *